UNITED STATES PATENT OFFICE.

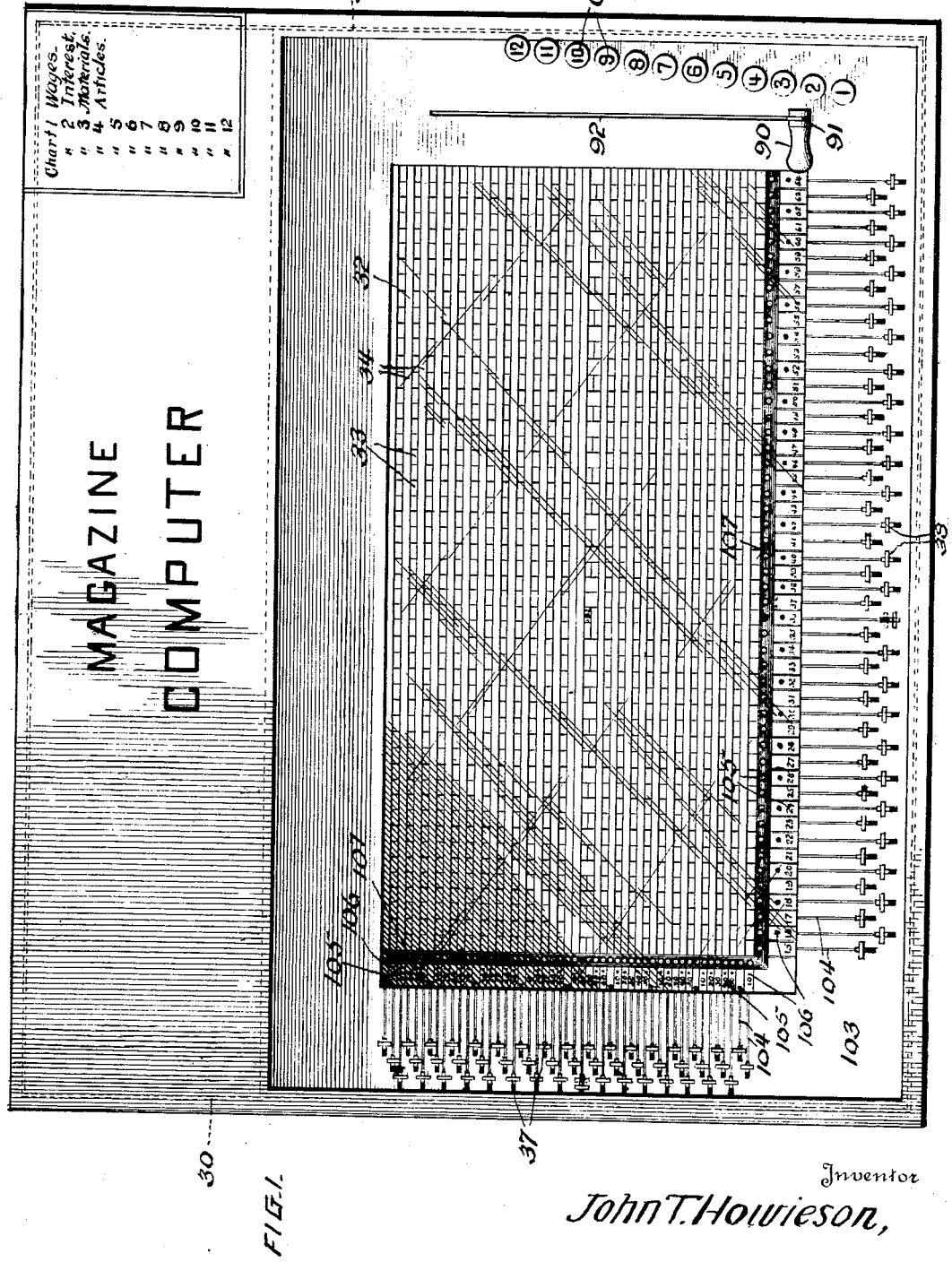

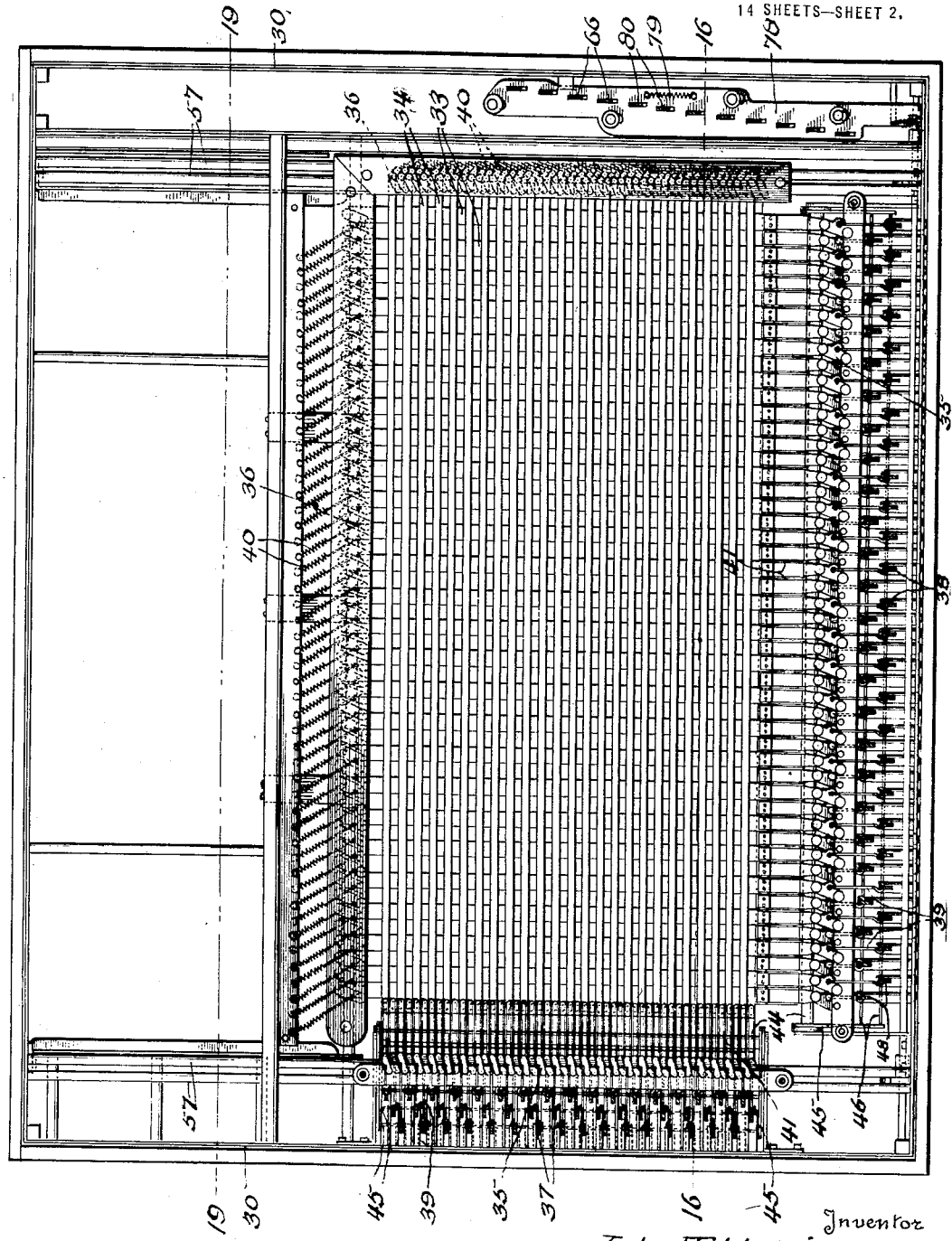

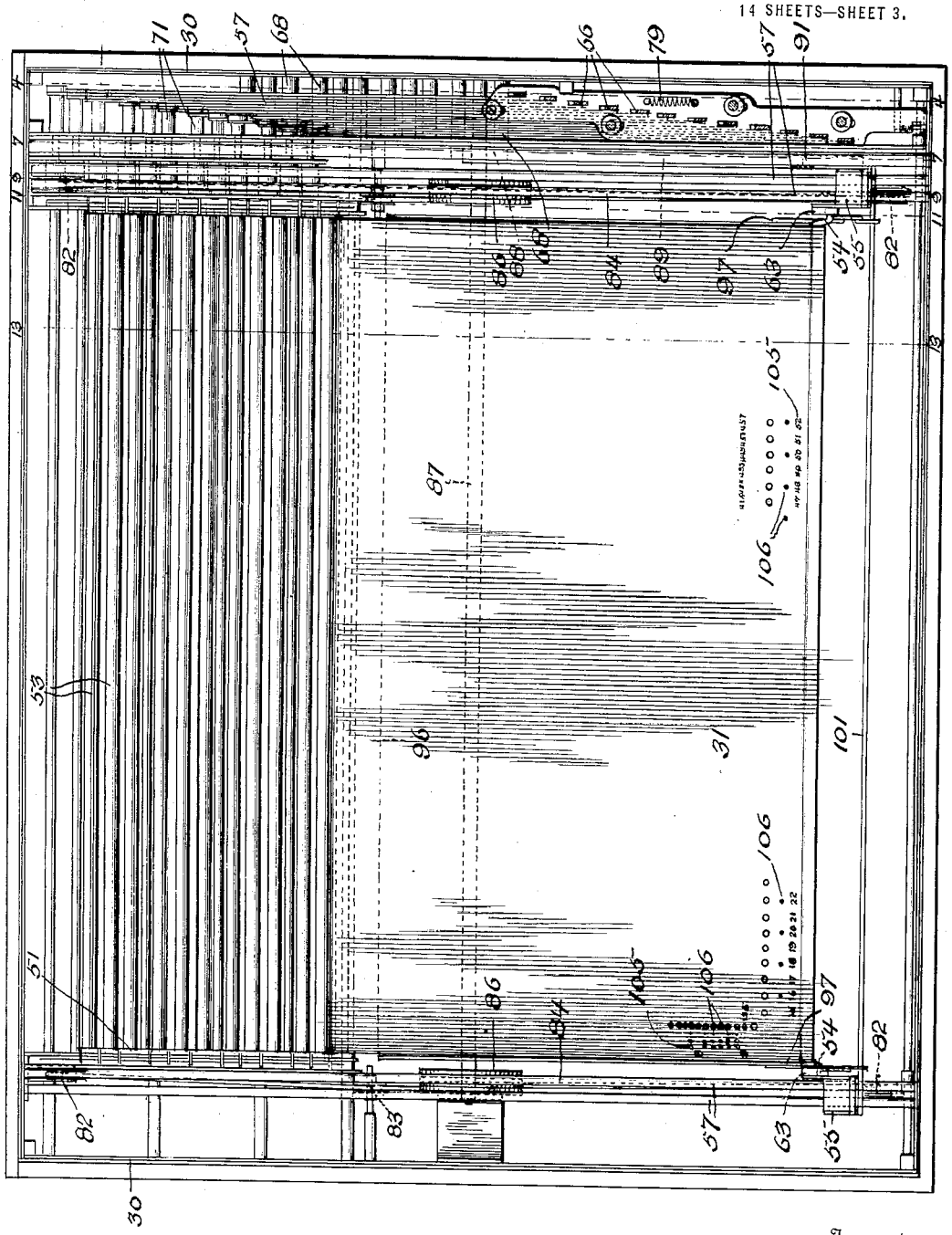

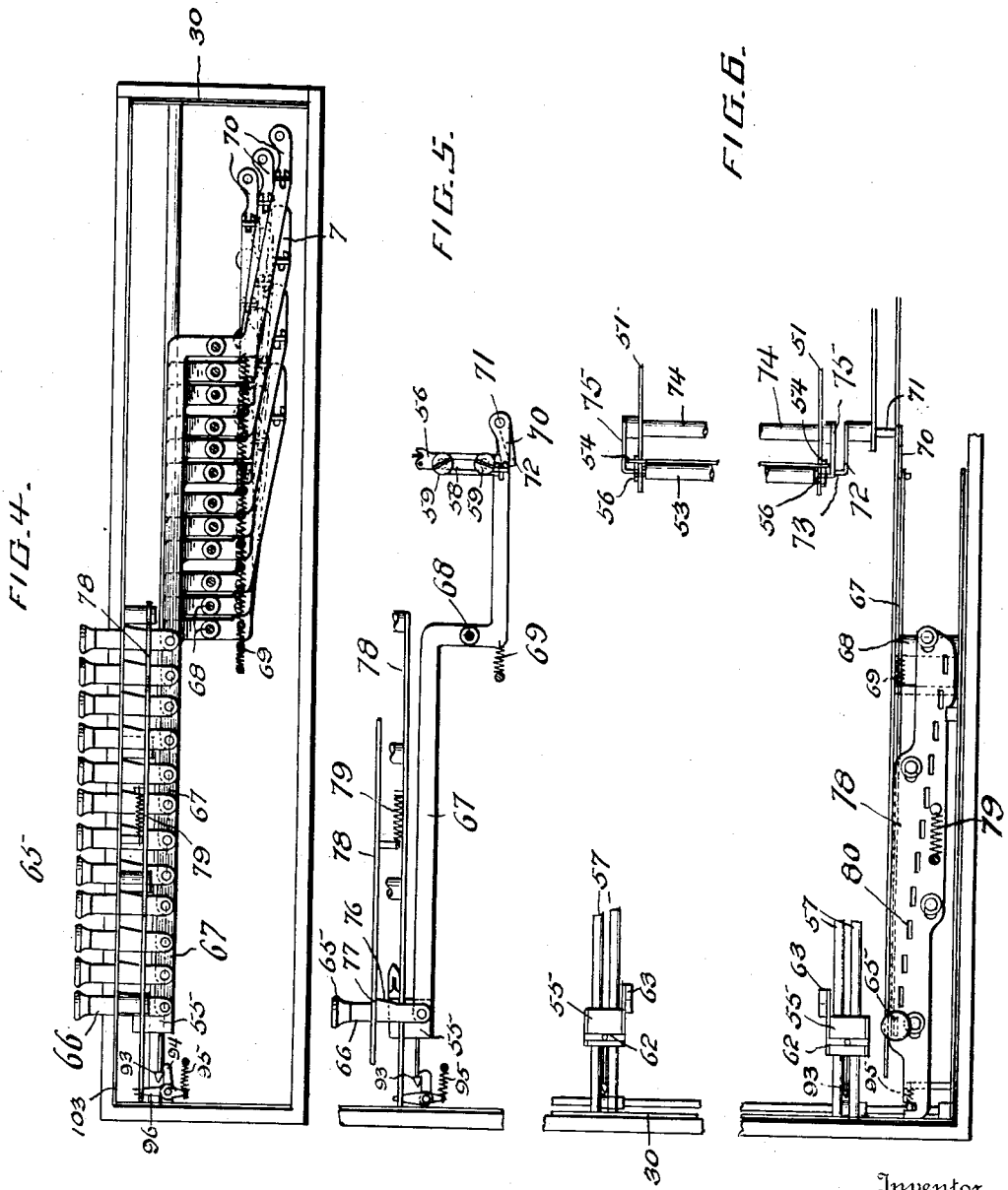

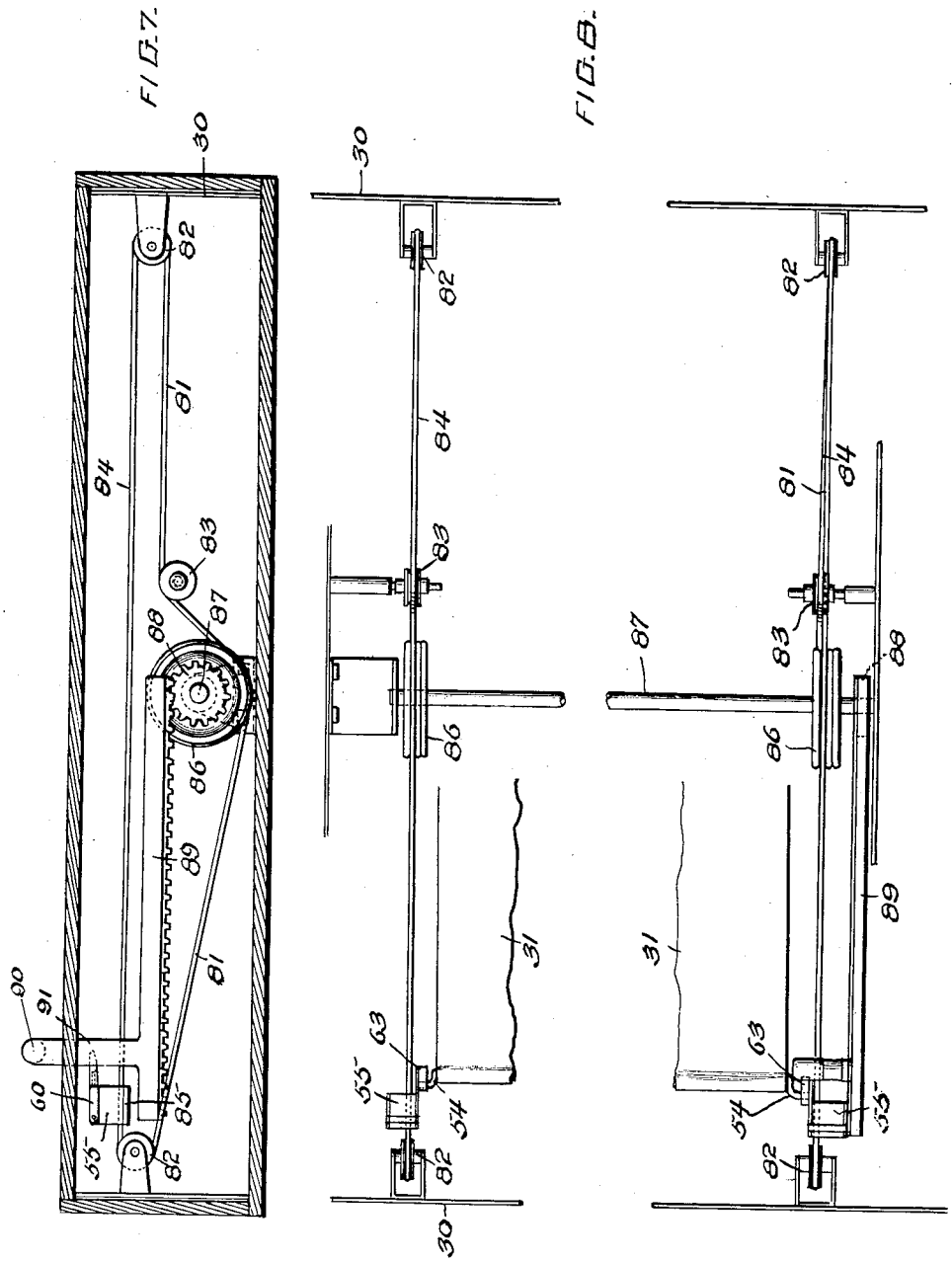

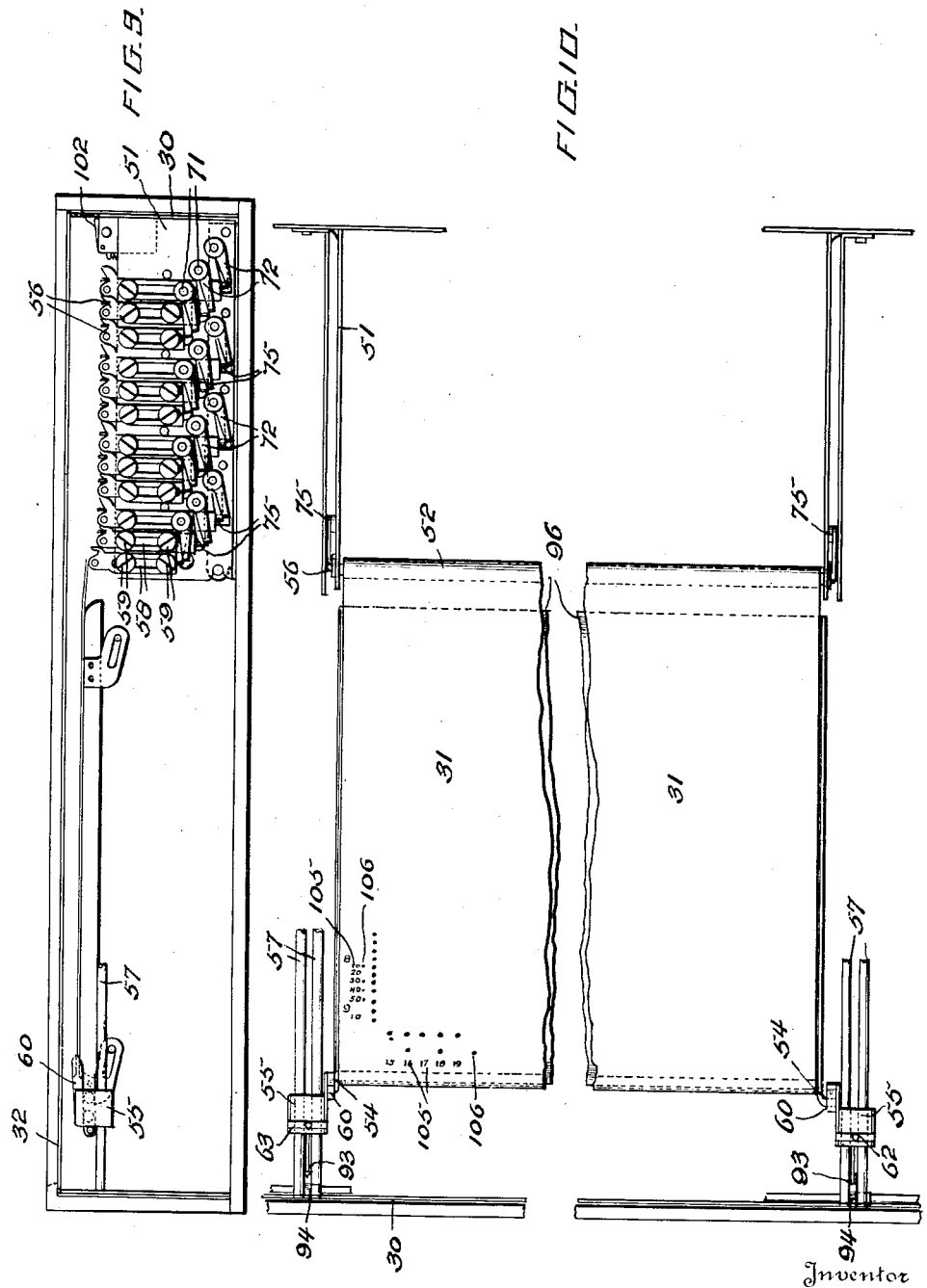

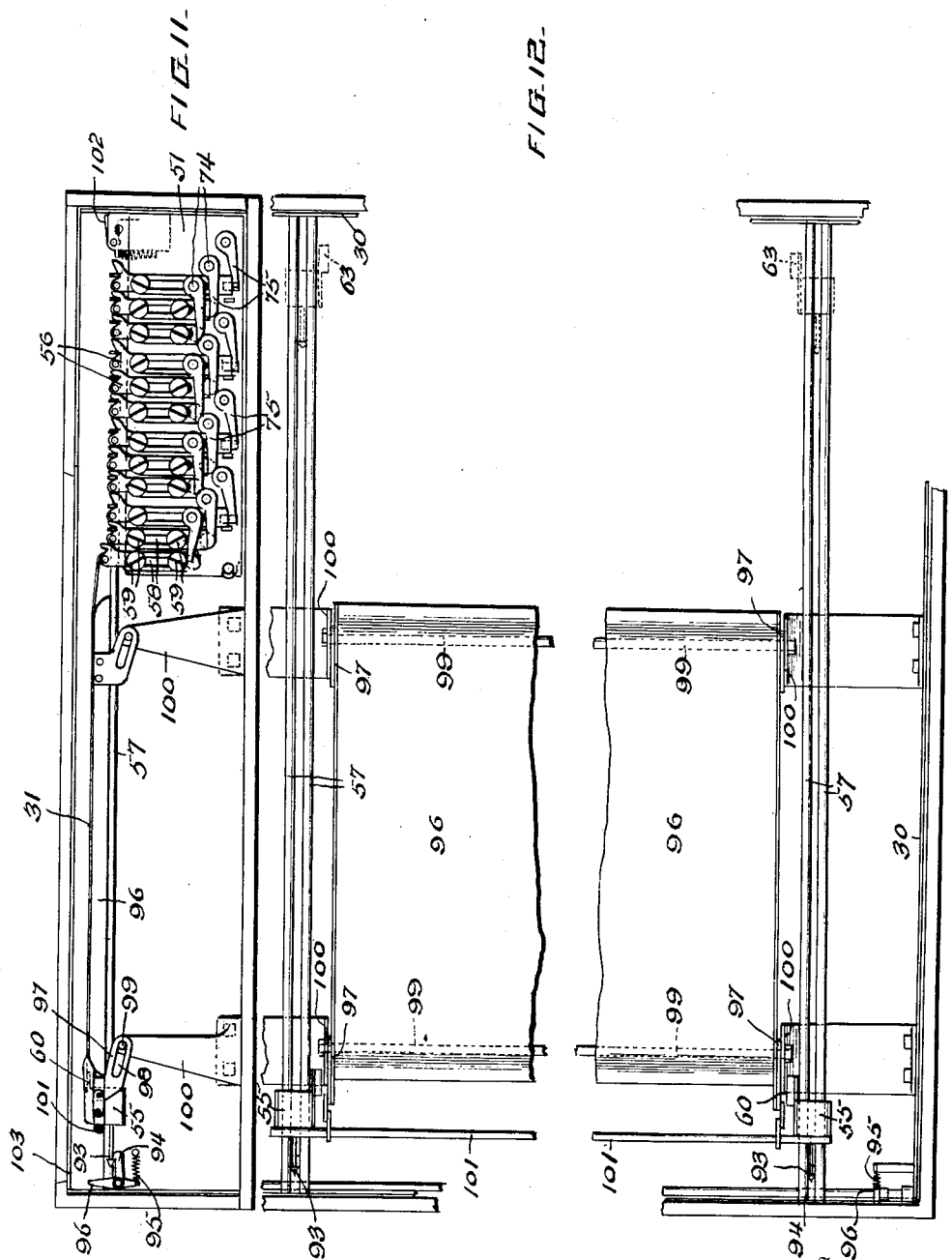

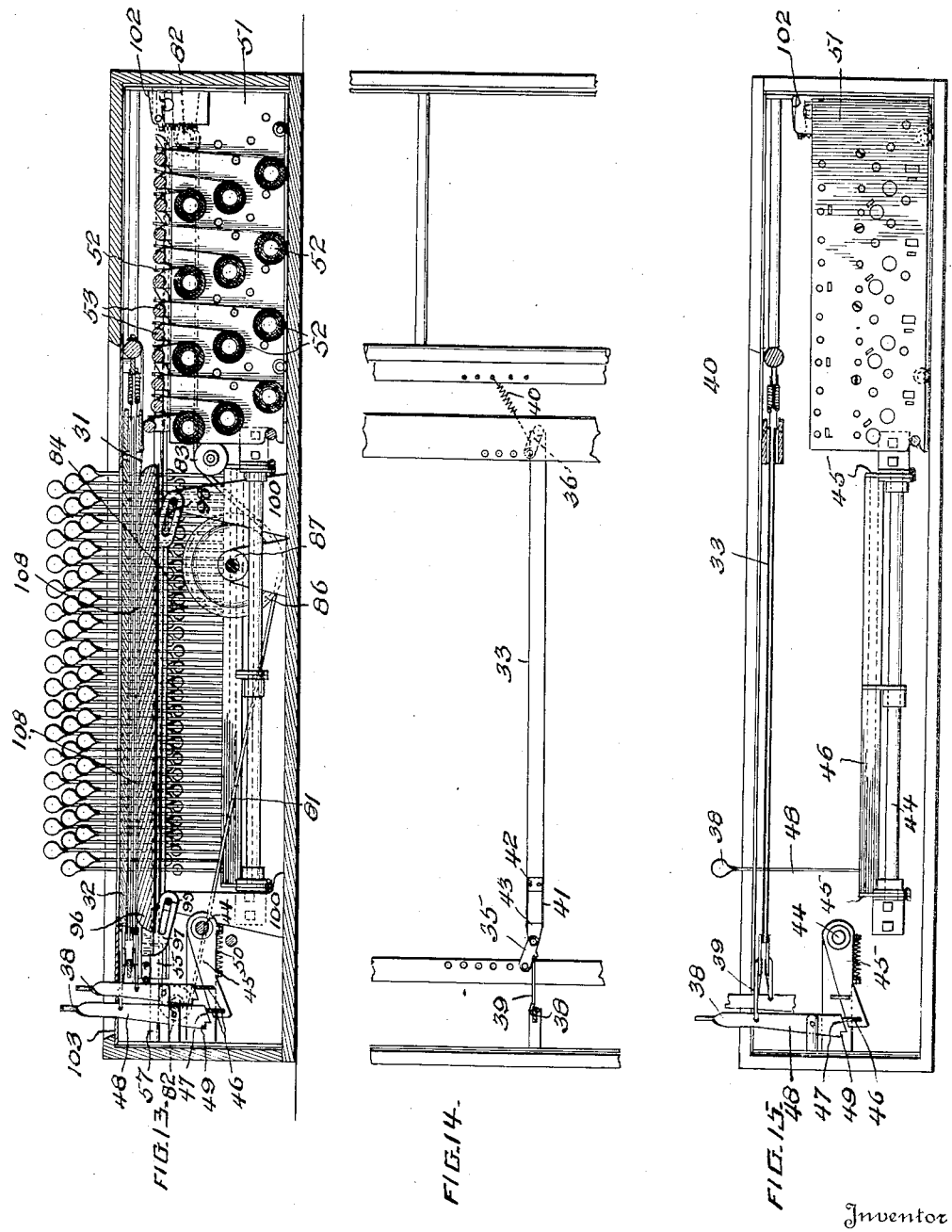

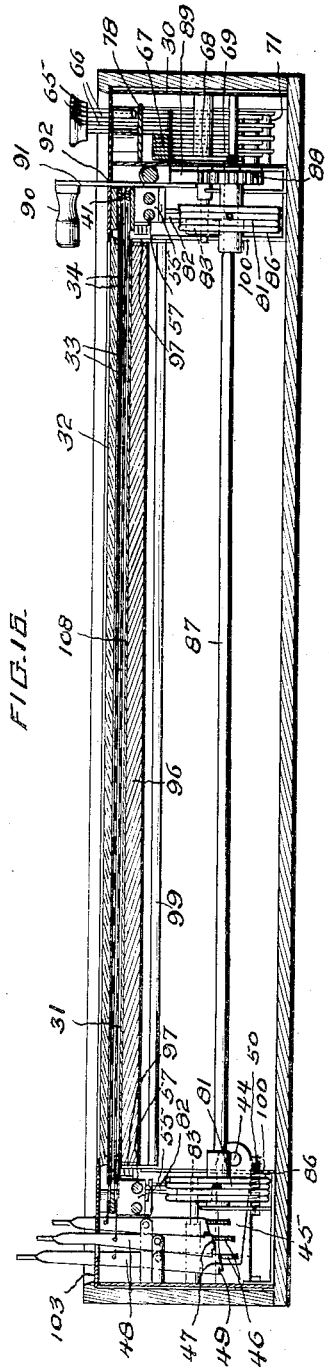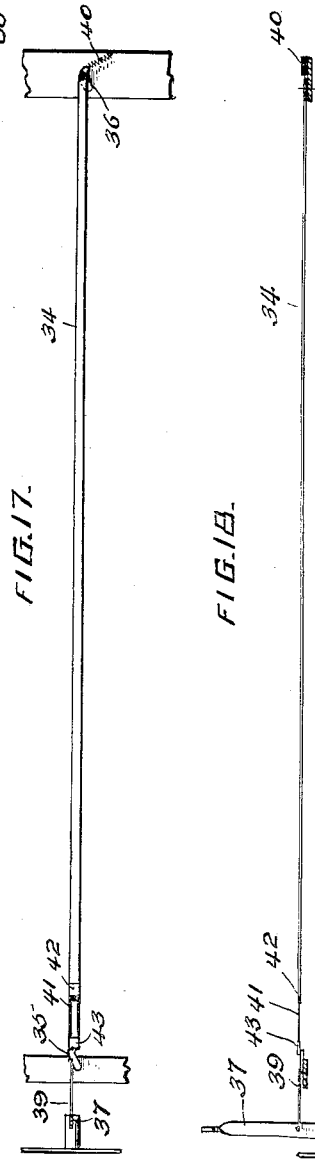

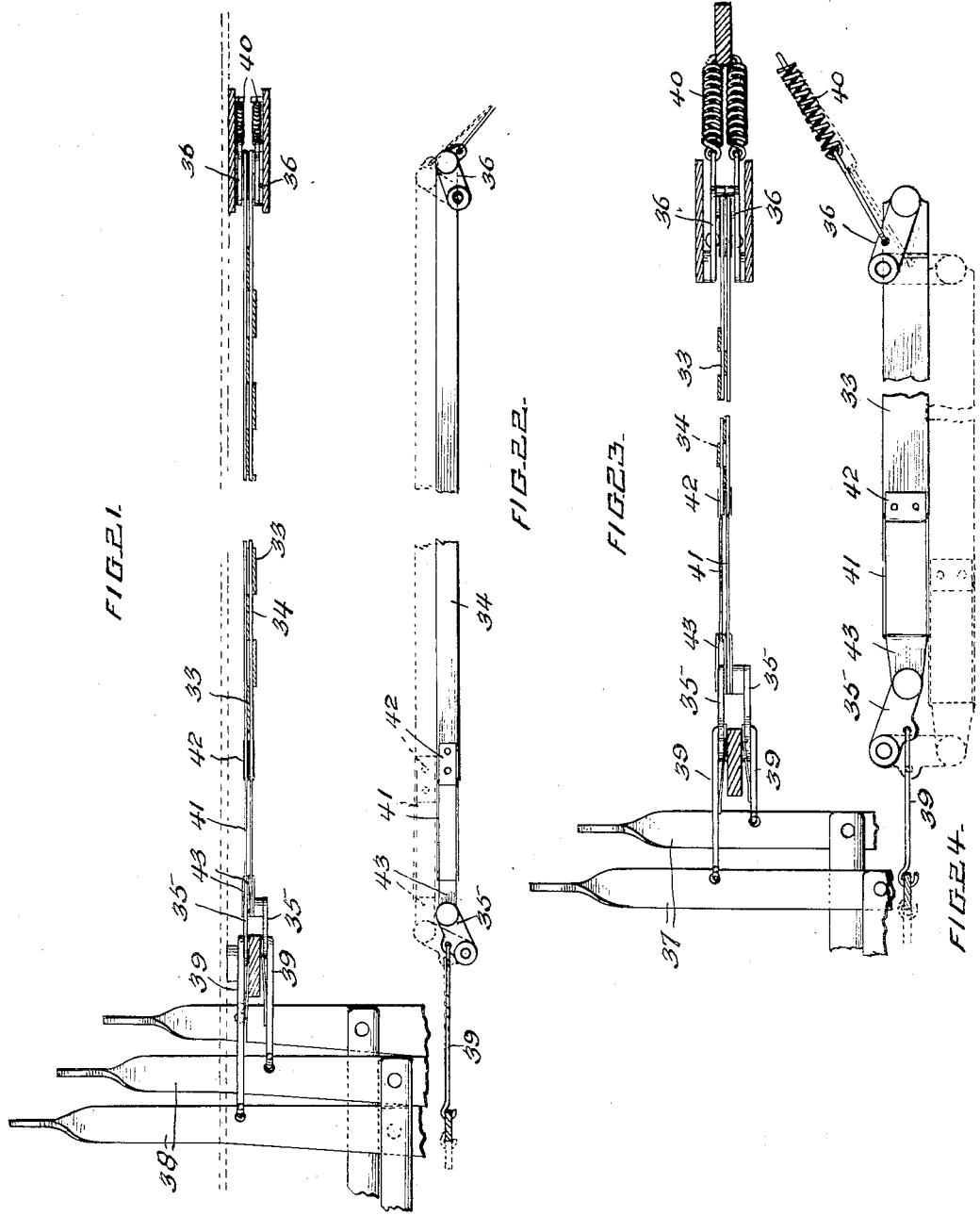

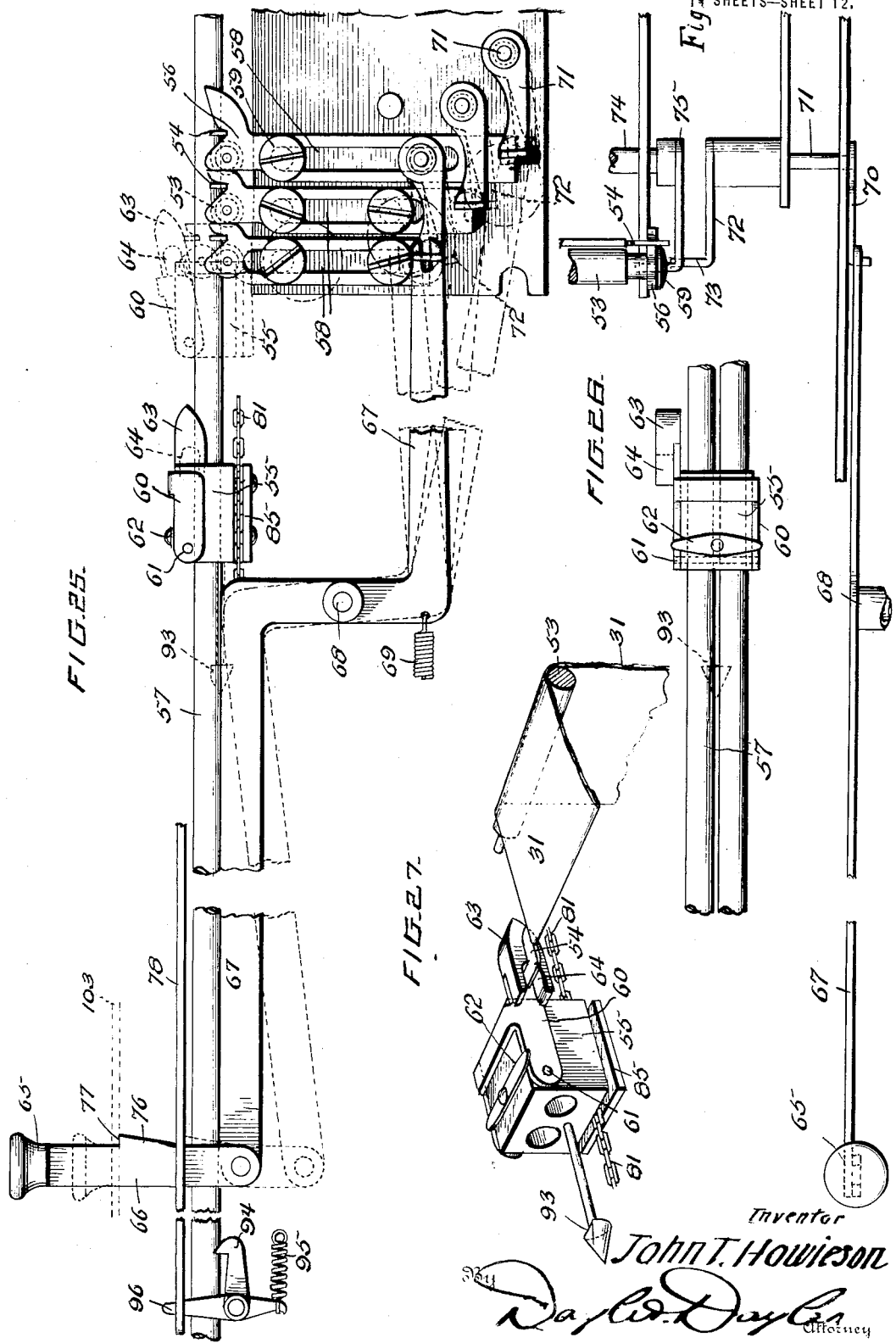

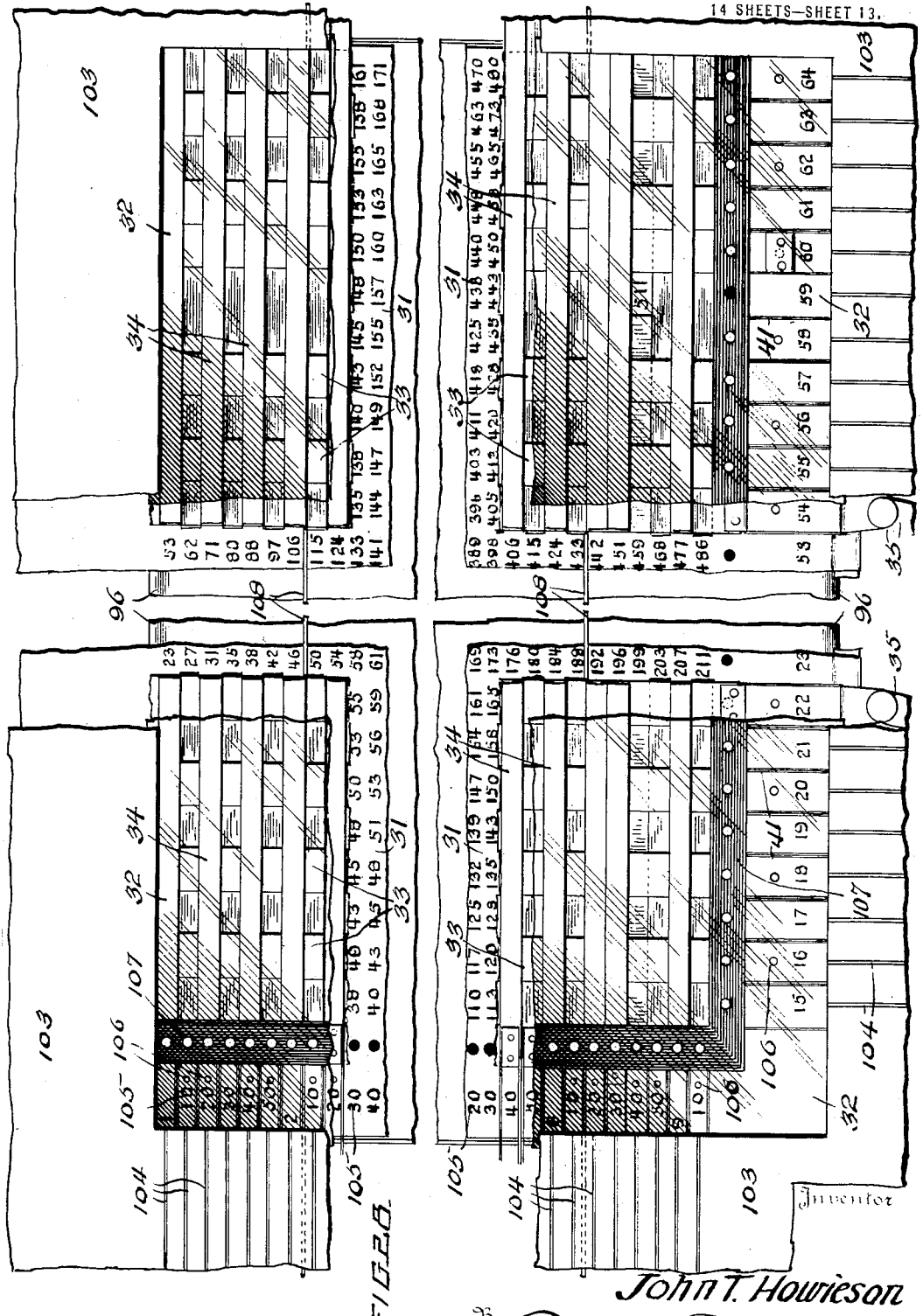

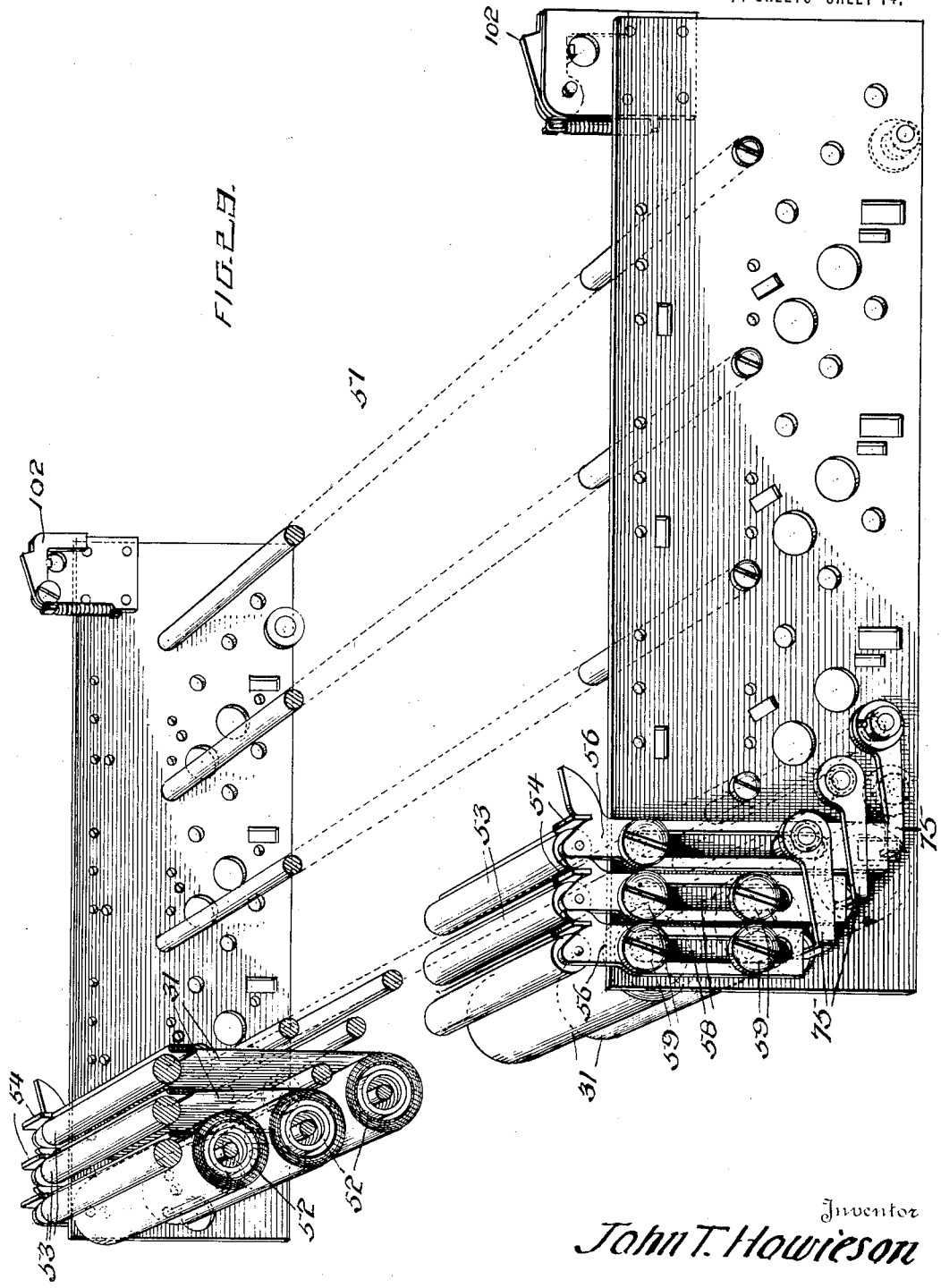

JOHN T. HOWIESON, DECEASED, LATE OF ROCHESTER, NEW YORK, BY ALIDA B. HOWIESON, ADMINISTRATRIX, OF FLUSHING, NEW YORK, ASSIGNOR TO ALIDA B. HOWIESON, OF FLUSHING, NEW YORK.

COMPUTING MECHANISM.

1,405,589.      Specification of Letters Patent.      Patented Feb. 7, 1922.

Application filed July 26, 1920. Serial No. 399,183.

*To all whom it may concern:*

Be it known that JOHN T. HOWIESON, deceased, formerly a citizen of the United States, and resident of the city of Rochester in the county of Monroe and State of New York, did invent certain new and useful Improvements in Computing Mechanisms, of which the following is a specification.

The object of the invention is to provide a computing or calculating mechanism of relatively simple construction and operation, wherein accuracy in result within a wide range of subjects may be secured,—the possibility of error being minimized by the exposure at one time of only one computation and by a complete system of checking and verification, together with mechanically true means for positioning and locking the movable elements in their computation-disclosing relations.

A further important object of the invention is to provide a mechanism of this general class wherein the surface of the table or chart bearing the computations is utilized to the maximum extent, so as to economize space while providing for a wide range of computations.

Further objects and advantages of the invention will appear in the course of the following description, it being understood that changes in form, proportions and details of construction may be resorted to, within the scope of the appended claims, without departing from the spirit of the invention.

In the drawings:—

Figure 1 is a general plan or face view of a preferred embodiment of the invention;

Figure 2 is a similar view with a portion of the casing omitted to show the means for supporting the elements of the screen;

Figure 3 is a similar view partly broken away to show the magazine chart holder and portions of the selector mechanism, and showing a chart in its extended position;

Figure 4 is a sectional view on the plane indicated by the line 4—4 of Fig. 3, to show the elements of the selector mechanism and the relative positions thereof;

Figure 5 is a detail view of one of the selector levers and related parts;

Figure 6 is a plan view partly broken away of the mechanism illustrated in Fig. 5;

Figure 7 is a sectional view on the plane indicated by the line 7—7 of Fig. 3 to illustrate the carrier mechanism;

Figure 8 is a plan view partly broken away of the parts of the carrier mechanism;

Figure 9 is a sectional view on the plane indicated by the line 9—9 of Fig. 3 to show the operated elements of the selector mechanism which cooperate with those illustrated in Figs. 4, 5 and 6;

Figure 10 is a plan view partly broken away showing one of the tables or charts extended;

Figure 11 is a sectional view on the plane indicated by the line 11—11 of Fig. 3 showing elements of the selector mechanism concealed in Fig. 9 and also showing the platen or platform support and the means for locking and positioning the extended chart;

Figure 12 is a plan view partly broken away of the parts illustrated in Fig. 11;

Figure 13 is a section on the plane indicated by the line 13—13 of Fig. 3 through the chart holding portion of the magazine and the body of the screen;

Figure 14 is a detail plan view of one of the screen elements showing its mountings;

Figure 15 is a sectional view parallel with the plane of that shown in Fig. 13 to illustrate more in detail the means for operating the screen elements and the devices for consecutively locking and holding said elements in adjusted positions;

Figure 16 is a sectional view on the plane indicated by the line 16—16 of Fig. 2;

Figure 17 is a plan view of one of the screen elements with its mountings;

Figure 18 is an edge view of the screen elements shown in Fig. 17;

Figure 19 is a sectional view on the plane indicated by the line 19—19 of Fig. 2;

Figure 21 is a detail section on the plane indicated by the line 21—21 of Fig. 20;

Figure 22 is a detail plan view of one of the screen elements showing in dotted lines its adjusted or displaced position;

Figure 23 is a sectional view on the plane indicated by the line 23—23 of Fig. 20;

Figure 24 is a detail view of one of the screen elements shown in Fig. 23 showing the same in dotted lines in its adjusted or displaced position;

Figure 25 is a detail enlarged view partly broken away of the selector mechanism with the traveller of the carrier shown in operative relation thereto;

Figure 20:
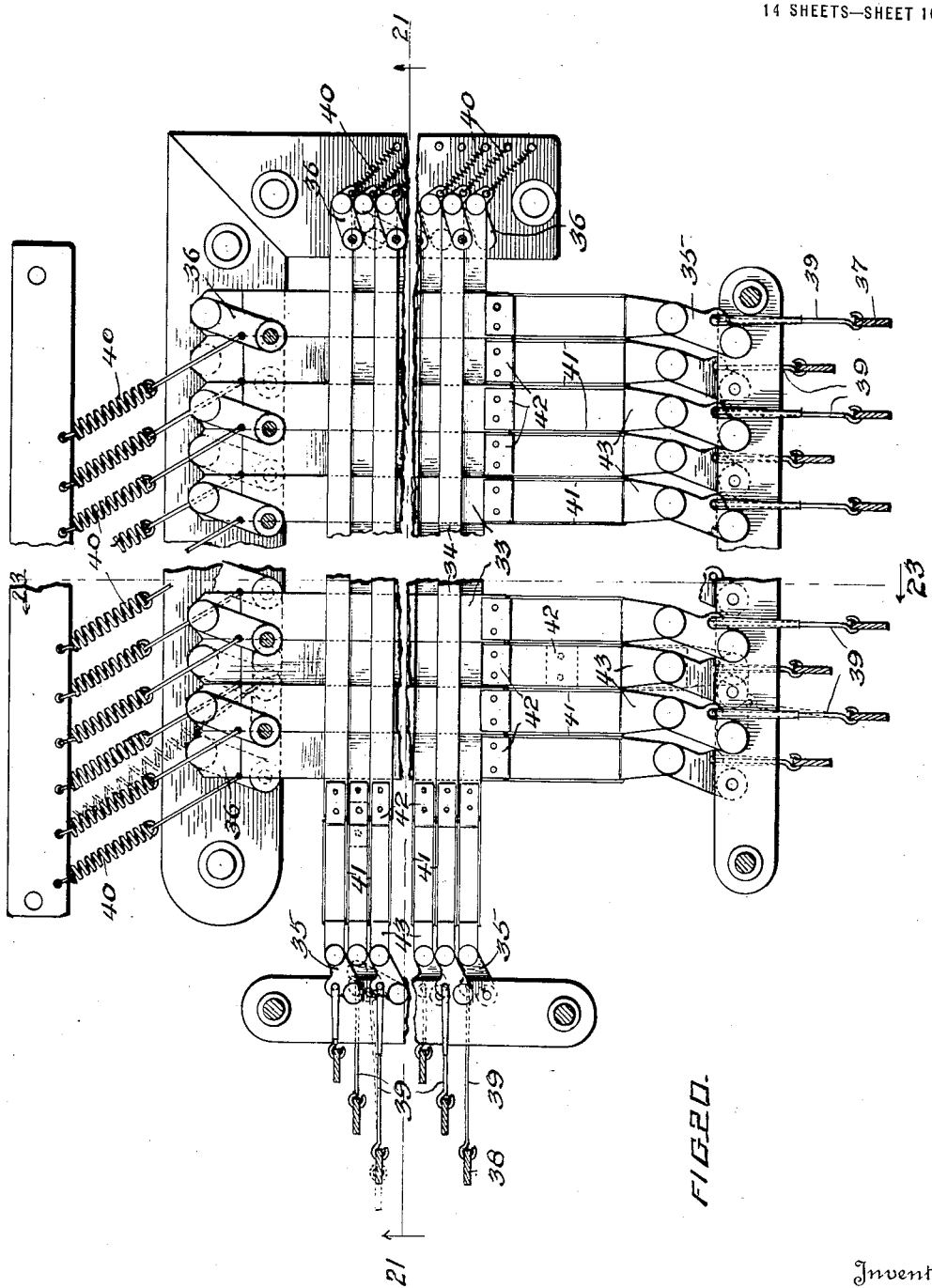
Figure 20 is a detail plan view on an enlarged scale of a portion of the screen and its mountings and related parts.

Figures 26 and 26ª represent a broken plan view of the mechanism shown in Fig. 25, only one shifting element being included;

Figure 27 is a detail view in perspective of the traveller showing its engaged relation with a chart as the latter is seen when partly extended;

Fig. 28 is a plan view of a portion of my device, parts being broken away so that the platen, chart and screen will be shown; and Fig. 29 is a view showing the mounting of the charts in the magazine.

Essentially the mechanism embodying the invention consists of (a) a table or chart bearing computations and their related factors in any desired line of computation, which table or chart may be multiplied to any desired extent to cover various subjects of computation or calculation; (b) a screen which, under normal conditions, completely conceals all of the computations on the table or chart and which consists of elements disposed in series with each element normally concealing a column of computations, and the elements of the different series being disposed on intersecting lines whereby the displacement of an element of each series will expose only a single computation, together with means for displacing and returning said elements; (c) a plurality of magazines each capable of containing a plurality of extensible tables or charts, any of which may be exposed or arranged in operative relation with the screen, the magazines being interchangeable so as to provide for the use in connection with the machine of an unlimited number of tables or charts; (d) a selector mechanism so constructed as to be adapted to be operated to indicate or select a particular table or chart for extension or exposure for the use of the operator; (e) a carrier provided with means for picking up and extending a selected table or chart so as to bring it into operative relation with the screen, and including a traveller for traversing the path of the free end of the table or chart and for securing the complete extension of the same regardless of its storage position in the magazine; (f) a chart positioning means such as a platen or platform for locating the table or chart in its proper relation with the plane of the screen so that the exposure of only one computation is effected; and (g) a chart positioning device for accurately determining the degree of extension of the table or chart so that the computations thereof may be brought lineally into proper relation with the elements of the screen, together with suitable trips and releasing devices whereby one chart is released and re-stored before another can be selected and extended, and whereby one selector element is released when another is actuated, and whereby one screen element in the same series is released and re-stored to its normal position by the operation or displacement of another element of the same series.

It is obvious that various modifications as to detail of these various cooperating members or mechanisms of the machine may be adopted, but those which are shown in the accompanying drawings are illustrative and are constructed as follows:

Within a suitable frame or casing 30 there is arranged a table or chart 31 (shown in plan and partly broken away in Fig. 3, and also more in detail in Fig. 10) provided with intersecting columns of computations or calculations, the parallel columns being arranged in juxtaposition so as to utilize the entire surface of the table or chart and thus economize space while giving the widest possible range of utility to the machine, suitable means being provided as explained hereafter, for supporting and holding said table or chart and for positioning the same with reference to a transparent protecting plate 32 of glass or other similar material and in proper relation with a screen consisting of related series of elements 33 and 34, said elements of one series being arranged on lines intersecting those of the other series and each element being adapted to cover and conceal a corresponding column of computations on the table or chart. The elements of each series cooperates so as to completely conceal the computation bearing surface of the table or chart, whereby the displacement of an element of each series is necessary to expose a computation, and the displacement of an element of each series can expose but one computation. To accomplish this and also to permit of the free transverse or lateral displacement of each element, within the smallest possible space measured perpendicular to the plane of the table or chart, the elements of each series are arranged in staggered relation and in what may be termed upper and lower or outer and inner tiers as indicated most clearly in Figs. 20 to 23 inclusive. Thus an element 33 of one series can be moved laterally over or under, so as to register or lie coextensive with, the corresponding element 33 of the same series but of the other tier, and at the same time by alternating the elements as by placing a tier of the elements 33 between the outer and inner tiers of the elements 34, the elements of one series serve as means for guiding the elements of the other series in their transverse movements.

In order that the elements of the screen, which may be of any suitable thin light material, may be accurately moved in displacing or re-storing the same there are shown terminal supporting levers 35 and 36, suitably pivoted at their outer ends to members of the frame and at their inner ends to said screen elements, and with the former of these levers are connected levers 37 and 38, as by means of rods 39, while to the latter of said levers are connected return springs 40, whereby when a lever 37 or 38 is operated it serves through a lever 35 and the connected strip or element of a screen to communicate motion to the corresponding lever 36 whereby the element is moved laterally in a path determined by the pivotal points of said levers 35 and 36 and in opposition to the tension of the return spring connected with the lever 36, to a position such as that indicated in dotted lines in Fig. 24, whereas upon the release of the lever the action of the spring serves to restore the parts including the screen element to the normal position. Also in order to secure an equalization of strain upon the fragile strip constituting the screen element, and serve to avoid the twisting or warping thereof and cause it to travel accurately in a path parallel with the transparent face plate, the connection between one end of the strip and the operating lever 35 is secured by a fine wire loop 41, having its ends engaged respectively with loops 42 and 43 attached to the strip and link respectively.

The operating levers for the two series of intersecting screen elements are arranged in banks preferably at the front and one end of the casing respectively, said levers for facility of operation being disposed in staggered relation as shown plainly in Figs. 1, 2 and 3, and also in detail in Figs. 16, 21 and 23, whereby the risk of operating the wrong lever is minimized. In order that a displaced screen element may be held in its exposed position temporarily while a computation is being read, and also in order to provide for the release of a lever of either series, and hence the restoration or replacement of the corresponding screen element when another lever of the same series is operated, so that only one computation may be exposed at a time, a locking device may be employed consisting, for example, of a rocker having a shaft 44 and radial arms 45 carrying blades or webs 46 in the paths of cams 47 on the lower portions 48 of the levers, each cam terminating in a shoulder or notch 49 which is adapted when a lever is depressed to the limit of its movement to displace a screen element, to be engaged by the corresponding blade or web 46 which is impelled into the notch by yielding means such as a spring 50 actuating the rocker. Obviously when a lever has been adjusted to displace a screen element it is locked and held in that position until the operation of a succeeding lever in the same series, whereupon the action of the cam on the second named lever will actuate the rocker in opposition to its spring 50 and thus release the first named lever to permit the replacement of the previously actuated screen element.

In order that the maximum capacity of the machine so far as the number of tables or charts adapted to be used therein is concerned, different tables or charts relating to computations on different subjects, provision has been made for disposing any one of a plurality of tables or charts to be brought into operative relation with the screen, and this is accomplished by employing a magazine 51 in which a plurality of tables or charts may be stored as upon spring rewinding rollers 52 mounted in the frame of the magazine, the charts extending over suitable guiding or idle rollers 53 and being provided with terminal detents 54 (see Figs. 26 and 27) adapted for engagement by the traveller 55 forming part of a carrier mechanism illustrated in detail in Figs. 25 to 27 inclusive, and hereinafter more fully described. The storage rolls of the magazine, by reason of their actuating springs, serve to maintain the tables or charts under tension, and also to rewind and store a chart when released and to offer sufficient resistance to the extension of the chart to insure its proper flat, smooth and even exposure when brought into operative relation with the screen. When a chart is rolled or stored the detent 54 thereof is seated on a rest or holder 56 mounted for example on the side wall of the magazine casing and adapted for sliding movement in a direction perpendicular to the plane of the chart when extended and the plane of movement of the traveller 55 as defined by guides 57, said rests, for example, being slotted as at 58 to receive guide screws or pins 59. The detents are thus normally held in a common plane parallel with the path of movement of the traveller, and when it is desired to extend a particular chart for use the rest supporting the detent of that chart is elevated or moved in a direction perpendicular to the path of the traveller to a position indicated in dotted lines, (Fig. 25) so as to locate the detent in the path of a clutch member 60 carried by the traveller, and for example, mounted thereon as at 61 and yieldingly held in its normal position by a spring 62. The head 63 of the clutch is provided with a seat 64 for the reception of the detent on the chart, and after the positioning or selecting of a chart detent by the adjustment as above described of its rest 56, the movement of the traveller to the right in Fig. 25 will cause the clutch, which is cam-faced, to slide over the detent and then resume its normal position with its seat 64 in the plane of said detent. A reverse movement of the traveller will cause the engagement of the seat 64 with said detent and a further movement will extend the chart in opposition to its storing roller.

In order that this selection of the chart may be secured accurately and effectually a series of selector keys 65 may be conveniently arranged at one end of the machine, as for example, within reach of the right hand of the operator, each key having its shank 66 (see particularly Figs. 4 to 6 inclusive) pivotally connected with a lever 67, fulcrumed as at 68 and yieldingly held in its normal position with the key elevated by means of a spring 69, said lever having connection at the opposite end from the key with an arm 70 of a rocker which includes the rock shaft 71 and an inner crank arm 72 which in turn is disposed with a terminal 73 in operative relation with a rocker consisting of the rock shaft 74 and arm 75 which in turn is connected with the rest slide 56.

In order that an accurate and uniform operation of these various parts may be secured it is preferable to duplicate them at opposite sides of the machine, as for example, and as indicated in Fig. 3, the rests for the chart detents are duplicated, and the rock shaft 74 is extended continuously across the machine as suggested in Fig. 6, with the arm 75 duplicated so that the corresponding rests may be raised to the same extent and simultaneously, when motion is communicated to one of said arms by the means connected with the selector key. Moreover in order that the parts of the selector mechanism may be held in an adjusted position while a chart so designated is being used, the key shank 66 is provided with a cam 76 and a shoulder or notch 77 to cooperate with a locking slide 78 yieldingly held in its normal position by a spring 79 and having a series of openings 80 through which said key shanks extend. Obviously as a key is depressed the locking slide will be moved to the right in Figs. 5, 6 and 25, until the movement of the key has been sufficient to enable the slide by return movement due to its actuating spring 79 to engage the shoulder 77. The subsequent operation of another key will serve to displace the slide sufficiently to release the key previously depressed, which thereupon will return to its normal position under the influence of the spring 69.

As previously indicated the traveller 55 and its related parts form elements of a carrier shown in Figs. 7 and 8, and in detail in Figs. 25 to 27 inclusive, and including an endless tractor 81 consisting as illustrated of a chain passing around suitable idle or guide rollers 82 at opposite ends of the machine and 83 at an intermediate point thereof, having a long flight 84 disposed adjacent to and parallel with the guides 57 and secured to the traveller as by a clamping plate 85, and a multiplying drum 86. Preferably the tractor is duplicated as are the guiding means and the drum, and the drum elements may be connected by a spindle 87 so as to insure synchronous movement of the parts. Also motion is communicated to the drum as by providing it with a pinion 88 with which meshes a rack bar 89 having an operating handle 90 which preferably projects upward through the casing with its shank 91 arranged to operate in a slot 92. The forward and return movements of the rack bar, by the manipulation of the handle 90, serve to rotate the drum around which the tractor is wound, to impart longitudinal movement to the traveller, and by reason of the multiplying effect of the drum the traveller is caused to move throughout a path greatly in excess of the movement of the handle 90, so as to cover the entire range of movement of each and all of the charts whose detents, as will be noted, are located at different distances from the front of the machine, whereas all of them must be positioned when extended so as to bring their foremost columns of computations exactly under the foremost elements of the screen.

As hereinbefore indicated the charts are held in tension at all times by the storage rolls and are extended in opposition to this tension when engaged by the clutch of the traveller, and in order that accurate placing of an extended chart may be secured the traveller is provided with a tapered or arrow-head detent 93 for engagement by a catch 94 yieldingly held in engaging position by the spring 95. When the detent 93 has been snapped into engagement with the catch the foremost transverse column of computations of the chart which has been extended is accurately positioned under the corresponding element of the screen, and said chart is held taut and under tension until the depression of another selector key 65 shifts the locking slide 78 which is engaged with a tail piece 96 of the catch which causes the disengagement of said catch from the detent 93, whereupon the released chart is rewound or re-stored, and by this operation the operating handle 90 of the carrier mechanism is moved backward until the dropping of the chart detent into its seat on the rest 56 disengages the same from the clutch of the traveller. The operation of the successive selector key accompanying the release of the previously extended chart has restored the previously elevated rest so that it is in a position to receive the detent of the chart as it returns to the point of storage, and at the same time another rest has been elevated to position the detent of another chart in the path of the traveller clutch, so that after a complete backward or return movement of the handle of the carrier, a forward movement thereof will pick up another chart and extend it until locked in its exposed position as hereinbefore described.

As an auxiliary means for positioning an extended table or chart so that it may lie in a perfectly flat condition close to the plane of the screen there is employed a platen or platform 96 supported by brackets 97 which are provided with inclined or cam slots 98 operating on pins 99 supported by standards 100, suitably secured to the casing. This platen is provided with a stop 101 arranged in the path of the traveller of the carrier and consisting in the construction illustrated (as shown particularly in Figs. 11 and 12) of a transverse rod which is adapted to be simultaneously engaged by the duplicate travellers. As the traveller carrying a table or chart approaches its foremost position it engages the stop and by reason of the cam slotted brackets, the platen or platform is drawn forward and upward to properly position the extended portion of the chart. Obviously the disengagement of the catch 94 from the detent of the traveller, and hence the backward movement of the latter, permits the platen to drop away from the plane of the screen so as to permit the free traverse of the chart thereover to avoid contact between the chart and screen to prevent marring the surface of the chart which carries the computations.

As hereinbefore suggested the magazine chart holder which is adapted to contain a plurality of charts, any one of which may be extended as required in making calculations on different subjects, and which in the construction illustrated holds twelve charts (although this number is by no means arbitrary) may be interchanged with other magazines, and to this end the box or casing of the magazine which preferably carries the detent rests and the operated rockers for moving said rests, is removably fitted in a seat formed in the rear end of the machine casing, wherein it is adapted to be locked by a spring catch 102.

It has been suggested hereinbefore that the operating levers for the screen elements are arranged in banks, in staggered relation, so as to facilitate their operation and enable the manipulator to find the desired lever as much by "feel" or "touch" as by sight, and as a further safeguard against error, or as a further guiding means in operation, the frame plate 103, which is preferably metallic and in which the openings for the various levers and carrier operating means are formed, is provided with indicating lines 104 respectively extending from the screen operating levers toward and intersecting the inner edge of said frame plate, in the line of the screen elements with which said levers are connected. Also each chart or table, in addition to its columns of factors 105 is provided with means for distinguishably designating the levers in the several series of a bank, differently colored dots 106, or other means being employed for this purpose. For example, where, as in the left hand bank of levers a three-row series is employed, and where the chart has factors representing an integer and five fractions such as ten, twenty, thirty, forty and fifty, the designation of the lever representing the integer may be white and that of the fraction thirty white, thus indicating that the levers for both the integer and the thirty are in the innermost or adjacent row, while the designations of the keys of the second row representing the fractions ten and forty may be red, while the designations of the keys in the outermost row representing the fractions twenty and fifty are blue. This, of course, is a merely arbitrary example and may be modified as the requirements of each particular case may indicate. In the front bank of keys where only two rows are employed a simple alternate arrangement of the distinguishable designations will be sufficient, such as for example white and red.

A further safeguard and check under some circumstances may also be desirable, and to provide therefor the transparent cover plate under which the screen operates may be provided with an opaque band 107 having for each element of the screen which passes transversely thereunder an opening through which the chart or table may be seen when the corresponding screen element has been displaced by the operation of a key, and corresponding with these openings in the band there may be arranged on the screen elements distinguishable dots or markings of for example red or any readily observed color so that when a screen element is displaced as above, the exposure of this checking designation will be readily observable, and of course the lineal comparison thereof with the factor will accurately apprise the operator as to whether or not he has actuated the proper key.

It may be noted that as illustrated, and as may be preferable in practice, all of the essential elements of the mechanism as described may be constructed of stamped sheet or plate metal.

A further index for the guidance of the operator in selecting the proper levers for operation, is afforded by the loops 41 in Figs. 21 to 24 inclusive which form the lever-end terminals of the screen elements, in that they constitute factor displaying openings or frames through which the several factors of a chart are respectively visible. In other words, when any given chart is arranged in position for use, each factor thereof appears in the designating frame of the screen element connected with the lever which must be operated to expose a computation relating to that factor. Therefore, the particular chart which is extended places its own value on each screen operating lever.

Reference has been made heretofore to the object and function of the platform or platen which, while normally in a depressed position to permit of the free movement thereover of a chart during the extension and restoring thereof, is "set up" or brought to its operative position to hold the chart close to the plane of the screen just at the termination of the extension movement of the chart, whereby the latter is held in a flat and smooth condition where most readily visible to the operator in the manipulation of the machine. In order to prevent the movement of the screen elements, and particularly those of the lowermost or innermost set of elements, from rubbing or marring the surface of the chart, and more or less tending to obliterate the characters thereon, it is preferable to provide guiding elements for said innermost set of screen elements, such as fine wires 108, strung in a taut condition across the frame on lines transverse to those of said lowermost or innermost screen elements which operate adjacent thereto.

Any desired number of interchangeable magazines, respectively carrying any convenient number of charts indicating computations on different subjects may be employed in connection with a machine of this type, and as explained heretofore it is only necessary to disengage the catch 102 in order to release a magazine which may then be withdrawn from the seat in the frame to permit of the introduction of the magazine to be substituted, and that this operation may be effected with the utmost facility and without involving any adjustment or re-arrangement, otherwise by the operator, and yet enable the operator to proceed immediately with the manipulation of the selector mechanism by the actuation of one of the keys thereof, said selector mechanism embodies the two cooperating elements consisting of arms 72 and 75 which are carried respectively by the frame of the machine and the casing of the magazine, the proper relative positioning of said elements being secured merely by introducing the magazine into the seat provided for it. Inasmuch as the operating element 72 is permanently connected with its respective key, while the operated element is connected with its respective rest for a chart detent, the proper seating of a magazine disposes the parts of the selector mechanism for immediate operation in the selection of a chart to be extended.

Also, as hereinbefore indicated, the operation of substituting one chart for another, or extending one chart in lieu of another, consists merely in depressing the selector key of the desired chart and moving the handle 90 through one complete cycle, that is to say, moving it backward or from the operator to the limit of its path as defined by the guide slot 92 and then bringing it forward or toward the operator until the chart is engaged and held by the means described as being provided for that purpose. If a chart is already extended and it is desired to substitute another, the depression of the selector keys designating the desired chart will not only position the detent of that chart in the path of the traveller clutch, but will disengage the extended chart, permitting it to be rolled upon the storage roller in the magazine, such movement of the chart carrying the handle 90 backward until the chart detent drops from the traveller clutch into its proper rest which has been depressed by the operation of the aforesaid selector key, and the traveller is then free to pick up the detent of the second chart so that the latter may be extended into the position previously occupied by the first-named chart.

Attention is also called to the arrangement of the keys and their operating elements and their connections on either side of and forward of the path of the charts so that they are out of the way of a chart in extending or restoring it, and no relative adjustment of any of the operating parts is necessary when a change from one chart to another is necessary.

The operation of the device is as follows, it being assumed that a magazine 51 containing a plurality of charts has been fitted in the seat in the rear end of the machine casing and secured by the spring catch 102. Depressing the proper key 65 until it is held by shoulder 77 engaging with the locking slide 78 will cause lever 67 to operate the arm 70 and rock shaft 71 and crank arm 72. The crank arm 72, through its engagement with one arm 75, operates the rock shaft 74 and the other arm 75 at the other side of the casing and the arms 75 raise the rests or holders 56 carrying the detents 54 on the end of the chart into the path of the travellers 55.

Operating the handle 90 will cause the rack 89 to operate the shaft 87 and multiplying drums 86 operating the endless tractors 81 to move the travellers 55 to a point where the clutch members 60 of the travellers will engage the detents 54 of the chart. The handle 90 is then brought back until the detents 93 on the travellers engage the catches 84, thus holding the chart in position against the action of the winding spring of the chart roller, the travellers 35 engaging the stop 101 and moving the platen 96 attached thereto into position beneath the extended chart.

With the chart in position, factors on the chart are visible through the openings in the wire loops 41 thus designating the levers with respect to that particular chart. The computations are made by operating the levers corresponding to the factors employed, the levers, through their connections, operating the terminal supporting levers 35 and 36 to displace the corresponding screen elements, exposing the result of the operation, each lever being retained in the operated position by the engagement of the blades 46 with the shoulders 49 on the levers until the subsequent operation of a lever in the same bank withdraws the blades 46 from the shoulders.

When a different chart is desired, depressing the key 65 to raise the desired chart operates the locking slide 78 to withdraw the slide from a previously operated key and permits the spring 69 to return the key to normal position and also withdraws catches 94 from the detents 93, permitting the winding spring to operate the chart roller, winding up the chart and moving out the travellers 55 until the detents 54 are released by the clutch members 60, thus bringing the travellers 55 in the direction for engaging the newly selected chart and releasing the stop 101, permitting the platen 96 to fall away from the chart.

What is claimed is:

1. A calculating mechanism embodying a table of computations arranged in intersecting columns of relative values, and a table concealing screen composed of series of intersecting strips respectively covering the intersecting columns of computations, the alternate strips of each series being in different planes, each series completely covering all of the computations, and each strip being movable transversely into substantially coextensive relation with an adjacent strip.

2. A calculating mechanism embodying a table of computations arranged in intersecting columns of relative values, and a table concealing screen composed of series of intersecting strips respectively covering the intersecting columns of computations and independently movable transversely of their lengths, each series consisting of inner and outer sets of strips arranged in parallel planes for relative superposition when moved.

3. A calculating mechanism embodying a table of computations arranged in intersecting columns of relative values, and a table concealing screen composed of series of intersecting strips movable transversely of their lengths and respectively covering the intersecting columns of computations, each series consisting of inner and outer sets of strips arranged in parallel planes, an element of one set being movable into substantially coextension registration with the adjacent element of the other set.

4. A calculating mechanism embodying a table of computations arranged in intersecting columns of relative values, and a table concealing screen composed of series of intersecting strips movable independently and transversely of their lengths and respectively covering the intersecting columns of computations, each series consisting of inner and outer sets of strips arranged in parallel planes with the elements of a set of one series interposed between the planes of the elements of the sets of the other series.

5. A calculating mechanism embodying a table of computations and a screen having movable tensioned elements, an actuating lever for each element, and a connection between the lever and the element actuated thereby and including a flexible index framing loop held in tension by the connected element.

6. A computing mechanism having a table and a table concealing screen, the table consisting of a chart having a spring actuated storage roller, a chart extending device having a traveller for engaging the chart and traversing a path its full length for all computations parallel with the screen, and means for locking the traveller against the tension of the spring when the chart is in its fully extended position.

7. A computing mechanism having a table and a table concealing screen, the table consisting of a chart having yielding restoring means, a chart extending device having a traveller for engaging the chart at one edge and moving the same its full length for all computations in opposition to said restoring means, and means in cooperative relation with the traveller and said screen to position the chart.

8. A computing mechanism having a computation table and a table concealing screen, the table consisting of a chart having yielding restoring means, a chart extending device having a traveller for engaging the chart at one edge and moving the same its full length for all computations in opposition to said restoring means, and means in cooperative relation with the traveller and said screen to position the chart and consisting of mutually engaging elements for holding the traveller with the chart under tension with its computations in a predetermined relation with the screen.

9. In a computing mechanism having a table concealing screen and means for operating the same to expose a computation on any of a plurality of table carrying charts yieldingly held in housed positions, a chart engaging carrier for extending any one of the charts beneath the screen and selector mechanism for determining the chart for engagement by the carrier.

10. In a computing mechanism having a table concealing screen and means for operating the same to expose a computation on any of a plurality of table carrying charts yieldingly held in housed positions, a carrier for completely extending a chart beneath the screen and embodying a traveller having a predetermined limit of chart-extending movement each chart having terminal means for engagement by the traveller, and selector mechanism for positioning said terminal means of any one of the charts in the path of the traveller.

11. A computing machine having a table concealing screen and means for operating the same to expose a computation, an interchangeable chart housing magazine, a seat in which the magazine is removably mounted, a carrier provided with a traveller for engaging and extending a chart, and a selector mechanism for positioning a chart for engagement by the traveller, and having elements carried respectively by the magazine and its seat and relatively positioned by the seating of the magazine.

12. A computing machine having a table concealing screen and means for operating the same to expose a computation, an interchangeable magazine removably mounted in the machine, a carrier for engaging and extending a chart, and chart selector mechanism having cooperative elements respectively mounted upon the machine and the magazine and relatively positioned by seating the magazine.

13. In a calculating machine having a chart carrying a table of computations, a table concealing screen, means for extending a chart, and a platen between which and the screen the chart is extensible, said platen being movable toward and from the plane of the screen to bring said chart and screen into close contact.

14. In a calculating machine having a chart carrying a table of computations, a table concealing screen, a carrier for extending a chart, and a chart supporting platen spaced from the screen while the chart is being extended and movable by the carrier toward and from the plane of the screen.

15. In a calculating machine having a chart carrying a table of computations, a table concealing screen, a carrier for extending a chart, and a chart supporting platen movable toward the plane of said screen, the carrier having means for actuating the platen to bring said chart and screen into close contact.

16. A computing machine embodying a table of computations having its columns designated by factors, a screen consisting of elements for concealing the columns of computations, and means for operating the screen elements to display a computation, said elements having factor framing means for exposing same where the elements are in their normal positions.

17. A computing machine embodying a table of computations having its colums designated by factors, a screen consisting of elements for concealing the columns of computations, and means for operating the screen elements to display a computation, said elements having factor framing and exposing loops.

18. A computing machine embodying a table of computations arranged in intersecting columns, a screen composed of relatively movable column concealing elements and stationary guides interposed between the table and the adjacent surfaces of said screen elements on lines between the columns of computations to prevent contact between the table and screen.

19. A computing machine having a table of computations, a screen comprising relatively movable computation-concealing elements, means for actuating the screen elements, and sets of related indices on the table, those of one set being normally exposed and those of the other set being normally concealed by the screen elements, and adapted for exposure by displacement of a screen element.

20. In a calculating mechanism, a pivotally supported character concealing strip and operating means for said strip adapted to cause said strip to pivot on its supports.

21. In a calculating mechanism, a character concealing strip, levers supporting said strip, an operating lever and means connecting said operating lever to one of said supporting levers.

22. In a calculating mechanism, a plurality of character concealing strips lying in different planes, levers supporting said strips and adapted to swing the strips of one plane to register with the strips of another plane.

23. In a calculating mechanism, a character concealing strip lying in one plane, a character concealing strip lying in another plane and levers moving in a horizontal plane supporting said strips and adapted to swing the strip of one plane to register with the strip of the other plane.

24. In a calculating mechanism, a pair of levers, a character concealing strip connected to one of said levers, an index exposing loop connecting the strip to the other of said levers and operating means for said levers.

25. In a calculating mechanism, a character concealing strip, an index exposing loop connected to said strip, pivoted supporting means for said strip and loop and operating means connected to said supporting means.

26. In a calculating mechanism, a pair of levers, a character concealing strip connected to one of said levers, an index exposing loop connecting the strip to the other of said levers, an operating lever and means connecting said operating lever to one of said pair of levers.

27. In a computing mechanism having a chart carrying a table of computations, a table concealing screen, a carrier for positioning the chart and a chart supporting platen spaced from the screen during the movement of the chart and movable toward the plane of the screen.

28. A calculating mechanism embodying a table of computations and a screen having movable elements, an actuating lever for each element and a connection between the lever and the element actuated thereby including an index framing loop.

29. A computing mechanism having a computation table and a table concealing screen, the table consisting of a chart, a chart operating device having a traveller for engaging the chart and moving the same its full length for all computations and means in cooperative relation with the traveller and said screen to position the chart and consisting of mutually engaging elements for holding the traveller with the chart in a predetermined position.

30. In a computing mechanism having a table concealing screen and means for operating the same to expose a computation on any of a plurality of table carrying charts, a chart engaging carrier for positioning any one of the charts beneath the screen, a magazine holding the charts stationary and selector mechanism for determining the chart for engagement by the carrier.

31. In a calculating mechanism, a character concealing strip and pivotal means for determining the path of movement of said strip.

32. In a calculating mechanism, a character concealing strip, pivoted guiding means pivotally connected to said strip and operating means for said strip.

33. In a calculating mechanism, a character concealing strip, a pivoted guiding means controlling each end of the strip and operating means for said strip.

34. In a calculating mechanism, a character concealing strip pivotally supported at each end and operating means for said strip.

35. In a calculating mechanism, character concealing strips disposed in different planes, rockable means supporting said strips during a lateral movement of said strips and operating levers connected with some of said rockable means.

36. A character concealing strip, separate rockable means connected with each end of said strip and operating means connected with one of said rockable means.

37. In a calculating mechanism, a table concealing screen, a magazine containing a plurality of table carrying charts, a carrier for placing the charts beneath the screen and a selector mechanism comprising separate operating mechanism for each chart for positioning the charts for engagement by the carrier.

38. In a calculating mechanism, a table concealing screen, a magazine containing a plurality of table carrying charts, a carrier for extending the charts beneath the screen and means for simultaneously selecting a chart to be engaged by the carrier and releasing the extended chart.

39. A calculating machine comprising a supporting frame, a table concealing screen and means for positioning a table carrying chart beneath said screen carried by said frame, a magazine adapted to contain a plurality of charts detachably secured to said frame and a selector mechanism comprising complimentary parts for each chart mounted on said frame and said magazine adapted to cause the charts to project into the path of said carrier.

In testimony whereof I have hereunto signed my name.

ALIDA B. HOWIESON,
*Administratrix of John T. Howieson, deceased.*